United States Patent
Arunkumar et al.

(10) Patent No.: US 11,893,254 B2
(45) Date of Patent: Feb. 6, 2024

(54) DYNAMIC PERMISSION MANAGEMENT OF STORAGE BLOCKS

(71) Applicant: INTERNATIONAL BUSINESS MACHINES CORPORATION, Armonk, NY (US)

(72) Inventors: Saritha Arunkumar, Basingstoke (GB); Kuntal Dey, Rampurhat (IN); Seema Nagar, Bangalore (IN); Kartik Srinivasan, Karnataka (IN); Anjali Tibrewal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/303,674

(22) Filed: Jun. 4, 2021

(65) Prior Publication Data

US 2022/0391117 A1  Dec. 8, 2022

(51) Int. Cl.
*G06F 3/06* (2006.01)
*G06N 20/00* (2019.01)

(52) U.S. Cl.
CPC ............ *G06F 3/0637* (2013.01); *G06F 3/064* (2013.01); *G06F 3/0622* (2013.01); *G06F 3/0673* (2013.01); *G06N 20/00* (2019.01)

(58) Field of Classification Search
CPC ...... G06F 3/0622; G06F 3/0637; G06F 3/064; G06F 3/0653; G06F 3/0673; G06F 3/0683; G06F 3/0689; G06F 11/3034; G06N 20/00
USPC ......................................................... 711/163
See application file for complete search history.

(56) References Cited

U.S. PATENT DOCUMENTS

| 8,302,178 | B2 | 10/2012 | Camiel | |
| 8,566,446 | B2 * | 10/2013 | Cochran | G06F 3/0659 709/217 |
| 9,195,396 | B2 | 11/2015 | Peterson | |
| 2007/0250667 | A1 * | 10/2007 | Dement | G06F 12/125 711/136 |

(Continued)

OTHER PUBLICATIONS

Ruan, L., Bai, Y., Li, S. et al. Workload time series prediction in storage systems: a deep learning based approach. Cluster Comput (Jan. 13, 2021). https://doi.org/10.1007/s10586-020-03214-y (Year: 2021).*

(Continued)

*Primary Examiner* — Reginald G Bragdon
*Assistant Examiner* — Aaron D Ho
(74) *Attorney, Agent, or Firm* — Kimberly S. Zillig

(57) ABSTRACT

A method, a computer program product, and a system of dynamically managing permissions of storage blocks. The method includes predicting at least one storage block that will be accessed by a user on a storage device and predicting a time window when the storage block will be accessed the user. The predictions can be performed by a machine learning model trained using the historical accesses and access times of the user. The method also includes granting the user an access to the storage block during the time window and monitoring whether the storage block is accessed by the user. The method also includes determining, based on the monitoring, that the user accessed the storage block, and revoking the access to the storage block granted to the user after a predetermined access time.

14 Claims, 7 Drawing Sheets

(56) References Cited

U.S. PATENT DOCUMENTS

| | | | | |
|---|---|---|---|---|
| 2011/0010502 | A1* | 1/2011 | Wang | G06F 12/123 |
| | | | | 711/E12.001 |
| 2011/0078381 | A1* | 3/2011 | Heinrich | G06F 12/0897 |
| | | | | 711/E12.024 |
| 2012/0030431 | A1* | 2/2012 | Anderson | G06F 12/0862 |
| | | | | 711/E12.004 |
| 2012/0096226 | A1* | 4/2012 | Thompson | G06F 12/121 |
| | | | | 711/E12.001 |
| 2012/0173831 | A1* | 7/2012 | Rubio | G06F 3/0605 |
| | | | | 711/E12.002 |
| 2014/0032831 | A1* | 1/2014 | Asamoto | G06F 12/122 |
| | | | | 711/108 |
| 2014/0156706 | A1 | 6/2014 | Beecham | |
| 2015/0286576 | A1* | 10/2015 | Avudaiyappan | G06F 12/0859 |
| | | | | 711/122 |
| 2016/0078245 | A1* | 3/2016 | Amarendran | G06N 20/00 |
| | | | | 713/193 |
| 2016/0179392 | A1* | 6/2016 | Suto | G06F 11/3485 |
| | | | | 711/103 |
| 2017/0091047 | A1* | 3/2017 | Bangalore | G06F 11/1451 |
| 2018/0024867 | A1* | 1/2018 | Gilsdorf | G02B 6/4292 |
| | | | | 709/226 |
| 2019/0220214 | A1* | 7/2019 | Mio | G06F 3/0683 |
| 2019/0384718 | A1* | 12/2019 | Hansson | G11C 7/1063 |
| 2020/0341813 | A1* | 10/2020 | Dias | G06F 12/0868 |
| 2021/0034571 | A1* | 2/2021 | Bedadala | G06F 16/2379 |
| 2021/0279295 | A1* | 9/2021 | Koneru | G06F 16/24578 |
| 2021/0326458 | A1* | 10/2021 | Watson | H04L 9/0819 |
| 2022/0011941 | A1* | 1/2022 | Alverti | G06F 3/0604 |

OTHER PUBLICATIONS

Wu, H., Wang, C., Fu, Y., Sakr, S., Zhu, L., & Lu, K. (2017). Hpdedup: A hybrid prioritized data deduplication mechanism for primary storage in the cloud. arXiv preprint arXiv:1702.08153. (Year: 2017).*

Bodik, P., Griffith, R., Sutton, C., Fox, A., Jordan, M. I., & Patterson, D. A. (2009). Statistical Machine Learning Makes Automatic Control Practical for Internet Datacenters. HotCloud, 9, 12-12. (Year: 2009).*

H. Wang, J. Pannereselvam, L. Liu, Y. Lu, X. Zhai and H. Ali, "Cloud Workload Analytics for Real-Time Prediction of User Request Patterns," 2018 IEEE 20th International Conference on High Performance Computing and Communications, 2018, pp. 1677-1684, doi: 10.1109/HPCC/SmartCity/DSS.2018.00272. (Year: 2018).*

J. Panneerselvam, L. Liu, N. Antonopoulos and Y. Bo, "Workload Analysis for the Scope of User Demand Prediction Model Evaluations in Cloud Environments," 2014 IEEE/ACM 7th International Conference on Utility and Cloud Computing, 2014, pp. 883-889, doi: 10.1109/UCC.2014.144. (Year: 2014).*

Panneerselvam, J., Liu, L., & Antonopoulos, N. (2018). InOtRePCON: Forecasting user behavioural trend in large-scale cloud environments. Future Generation Computer Systems, 80, 322-341. (Year: 2018).*

J. M. Tirado, D. Higuero, F. Isaila and J. Carretero, "Predictive Data Grouping and Placement for Cloud-Based Elastic Server Infrastructures," 2011 11th IEEE/ACM International Symposium on Cluster, Cloud and Grid Computing, 2011, pp. 285-294, doi: 10.1109/CCGrid.2011.49. (Year: 2011).*

Aguilera, M. K., Ji, M., Lillibridge, M., MacCormick, J., Oertli, E., Andersen, D., . . . & Thekkath, C. A. (2003). {Block-Level} Security for {Network-Attached} Disks. In 2nd USENIX Conference on File and Storage Technologies (FAST 03). (Year: 2003).*

Patricia P. Griffiths and Bradford W. Wade. 1976. An authorization mechanism for a relational database system. ACM Trans. Database Syst. 1, 3 (Sep. 1976), 242-255. https://doi.org/10.1145/320473.320482 (Year: 1976).*

Abadi, M., & Fournet, C. (Feb. 2003). Access Control Based on Execution History. In NDSS (vol. 3, pp. 107-121). (Year: 2003).*

Aguilera, M.K., Ji, M., Lillibridge, M., MacCormick, J., Oertli, E., Andersen, D., Burrows, M., Mann, T., & Thekkath, C. (2003). Block-Level Security for Network-Attached Disks. FAST, https://www.semanticscholar.org/paper/Block-Level-Security-for-Network-Attached-Disks-Aguilera-Ji/631f3c144a27503f9135b412305422a4f3ce0acb.

Mell et al., "The NIST Definition of Cloud Computing," Recommendations of the National Institute of Standards and Technology, U.S. Department of Commerce, Special Publication 800-145, Sep. 2011, 7 pgs.

Chester Tugwell, "How to Restrict Editing to Parts of a Word Document," https://www.bluepecantraining.com/restrict-editing-parts-word-document/. Retrieved from the internet on Jun. 3, 2021.

* cited by examiner

DYNAMIC PERMISSION MANAGEMENT OF STORAGE BLOCKS

BACKGROUND

The present disclosure relates to permission management, and more specifically, to dynamically managing permission of storage blocks using predictive techniques to provide just-in-time and just-sufficient permissions to users.

Block storage, sometimes referred to as block-level storage, is a technology that is used to store data files in various environments. Block storage can break up data into blocks and then store those blocks as separate pieces, each with a unique identifier. An environment, such as a Storage Area Network (SAN), can also store those blocks across different systems. Additionally, each block can be configured (or partitioned) to work with different operating systems.

Block storage can also decouple data from user environments, allowing that data to be spread across multiple environments. This creates multiple paths to the data and allows a user to retrieve the blocks quickly. When a user or application requests data from a block storage system, the underlying storage system can reassemble the storage blocks and present the data to the user or application.

SUMMARY

Embodiments of the present disclosure include a computer-implemented method of dynamically managing permissions of storage blocks. The computer-implemented method includes predicting at least one storage block that will be accessed by a user on a storage device and predicting a time window when the storage block will be accessed by the user. The predictions can be performed by a machine learning model trained using the historical accesses and historical access times of the user. The computer-implemented method also includes granting the user access to the storage block during the time window and monitoring whether the storage block is accessed by the user. The computer-implemented method also includes determining, based on the monitoring, that the user accessed the storage block, and revoking the access to the storage block granted to the user after a predetermined access time.

Additional embodiments of the present disclosure include a computer program product including computer readable storage media of dynamically managing permissions of storage blocks, having computer executable instructions that, when executed by at least one computer, cause the at least one computer to execute the instructions to predict at least one storage block that will be accessed by a user on a storage device and to predict a time window when the storage block will be accessed the user. The predictions can be performed by a machine learning model trained using the historical accesses and access times of the user. The at least one computer also execute the instructions to grant the user an access to the storage block during the time window and monitor whether the storage block is accessed by the user. The at least one computer also executes the instructions to determine, based on the monitor, that the user accessed the storage block, and to revoke the access to the storage block granted to the user after a predetermined access time.

Further embodiments of the present disclosure include a system of dynamically managing permissions of storage blocks. The system includes a memory, a processor, local data storage having stored thereon computer-executable code. The computer-executable code includes the program instruction executable by a processor to cause the processor to perform the method described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
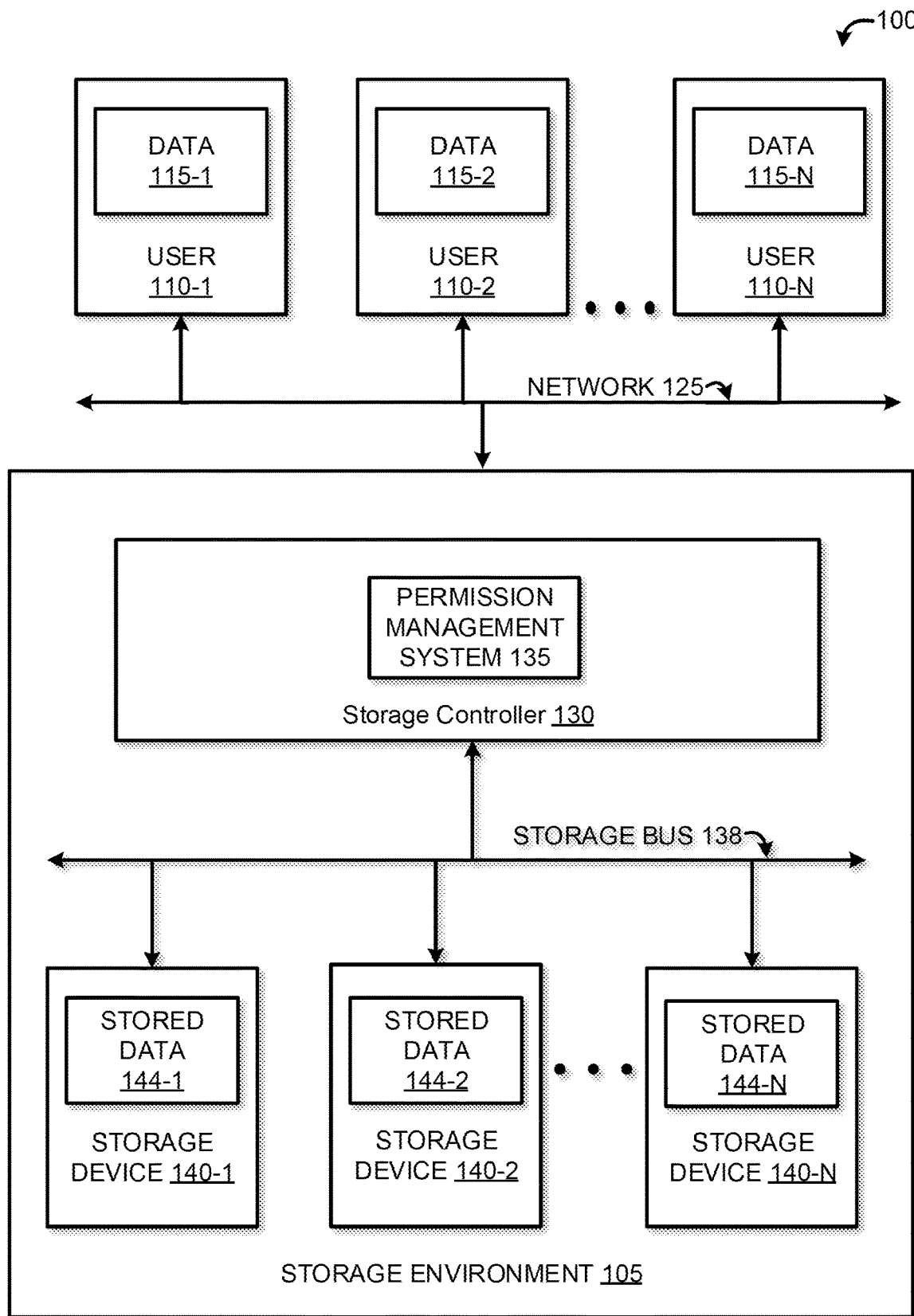
FIG. 1 is a block diagram illustrating a storage architecture used by one or more embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to permission management, and more specifically, to dynamically managing permission of storage blocks using predictive techniques to provide just-in-time and just-sufficient permissions to users. While the present disclosure is not necessarily limited to such applications, various aspects of the disclosure may be appreciated through a discussion of various examples using this context.

Storage devices (e.g., physical disks, virtual disks, storage systems, storage area networks, etc.) can perform storing processes to store data in storage blocks. The storage blocks are the basic storage capacity elements in storage devices. Block-based input/output ("I/O") is the process of writing and reading data in these granularly sized amounts. The block I/O commands can specify the type of operation to perform, the block address to work with, and the storage or control data being transferred. The size of each storage block can be determined by the file system or database system that manages the complete block storage address space. Additionally, the storage blocks can represent a logical file block of a physical disk sector on a storage device.

The storage address space, as used herein, is a sequence of contiguous, regularly sized storage blocks between a starting address and an ending address. From a host system perspective, the storage address space is the storage resource that a filing system manages. For example, data is written to a storage address space, where the data is written to either a physical disk or a virtual disk, and where the storage address space is made up of twenty contiguous storage blocks. The number of storage blocks for a given storage address space and increase or decrease based on the size of the data being stored.

Additionally, storage devices can utilize file systems that manage the placement of data in storage address spaces. One of the primary functions of a filing system is space allocation. This can involve what storage blocks to use and when new data is being written or when data is changed or updated, as well as what to do with the storage blocks that might be freed when objects are changed or deleted. File systems usually have some form of access permission scheme that determines what data different users and applications can access. As users attempt to open files, their identifications are checked against the security data associated with the file. If the user is authorized to work with the file, he or she gains the corresponding level of access. As such, it is possible to keep files from being viewed or updated without authorization.

Another role of filing is access control. Filing systems can have attributes or access control lists (ACLs) that determine who has the authority to access data objects. Typically, storing-level processes do not have the ability to provide access control, as storing-level processes have no contextual information about data objects.

Access control can also be provided through the file system application interface using file system semantics. The semantics of a file system can describe the methods by which data is exchanged between applications and a file system and can include control over which users or applications get to work with the data. A file system may have several options for opening files that can be used by application vendors for several reasons. For example, the semantics can include commands such as open with deny-write or open with deny-open that can be used when first opening a file to ensure that other works or application processes cannot interfere with the work being done by another person or application that opened the file initially.

Limitations on storage permissions remain, however, as current access permissions are limited to blanket permissions or denials. Additionally, some storage devices, such as direct-access storage (DAS) systems and small computer system interface (SCSI) systems, lack access control capabilities because security functions are provided strictly by the filing system and other system security functions. SAN networking technology can provide some network access security. However, the network access security is limited and rarely implemented.

Embodiments of the present disclosure may overcome the above, and other problems, by using a permission management system for dynamically managing permissions of storage blocks. The permission management system can predictively select storage blocks for locking and unlocking based on the storage block being accessed and the times when the storage block is accessed. The permission management can dynamically provide block-by-block locking on a given file system based on the predictions relating to a user and/or a container.

More specifically, the permission management system uses predictive techniques (e.g., machine learning techniques, most recently used (MRU), least recently used (LRU), round-robin, cache predictors, etc.) to predict the next set of storage blocks that are going to be accessed by a user and/or container. Additionally, using the same or other predictive techniques, the permission management system predicts an expected moment of time, or time window, when the access is required. The storage blocks can correlate to the physical location of the underlying file sectors. In the case of a volume group, for example, the logical addresses may suffice. Based on those predictions, the permission management system can grant access to the user to the predicted storage blocks during the moment in time predicted. After a predetermined amount of time, or other metrics, the permission management system can then restrict the access rights of the user to the storage blocks.

In some embodiments, the permission management system handles prediction errors by implementing a retry mechanism. When a user attempts block-by-block logical file access that was not previously predicted, the permission management system can determine the appropriate permissions and initiate the retry mechanism. If the user has the necessary permissions, then the permission management system can grant the user access to those unpredicted storage blocks. Additionally, a prediction command can be reissued that allows the permission management system to recompute access predictions based on the unpredicted storage blocks and the time when the request for access was made. Thus, the prediction component can account for that access and rectify the chain of next predictions made.

In some embodiments, the permission management system uses machine learning models using machine learning techniques to predict the storage blocks that the user is going to access. The machine learning models can input various pieces of information of the user and the storage device and use that information as training data to make its predictions. This information includes, for example, operating patterns of the user, programming patterns, context of the operating patterns, load conditions of the storage device, software stack at the time of accesses, historical accesses, and the like. Using the training data, the machine learning models can be trained to output a prediction on the storage blocks that will be accessed by a particular user and/or container.

In some embodiments, the permission management system also uses machine learning models using machine learning techniques to predict a time window for when the predicted storage blocks are going to be accessed by a user. The machine learning models can input various pieces of information of the user and the storage device and use that information as training data to make its predictions. This information includes, for example, operating patterns of the user, programming patterns, context of the operating patterns, load conditions of the storage device, software stack at the time of accesses, historical access times, and the like. Using the training data, the machine learning models can be trained to output a prediction on when the predicted storage blocks will be accessed by a particular user and/or container.

In some embodiments, the predicted storage blocks represent a portion of a file that a user may access. For example, an organization may utilize one document with various pieces of information within that document. Employees of that organization may have varying degrees of access to the document, such as write access and/or read access. Some employees may only be able to view and read certain paragraphs or pages within that document. As such, the permission management system can grant access to a portion of the file on a block-by-block level such that a particular employee is only given permissions and access for which they are allowed.

FIG. 1 is a block diagram illustrating an exemplary storage architecture 100 for dynamically managing permissions of storage blocks, in accordance with embodiments of the present disclosure. The storage architecture 100 includes a storage environment 105, one or more users 110-1, 110-2, 110-N (collectively "users 110"), where N is a variable integer representing any number of possible users 110, with data 115-1, 115-2, 115-N (collectively "data 115"), and a network 125. The storage environment 105 includes a storage controller 130, a storage bus 138, and storage device 140-1, 140-2, 140-N (collectively "storage devices 140"). The storage controller 130 is communicatively coupled with the storage devices 140 over the storage bus 138. The storage controller 130 includes a partition management system 135.

The storage environment 105 is a component of the storage architecture 100 configured to consolidate, manage, and operate data storage.), direct-attached storage, file servers, server-attached storage, network-attached storage, or in some embodiments, the storage environment 105 is a server or an aggregation of servers. Examples of the storage environment 105 include storage servers (e.g., block-based storage any other storage solution. In some embodiments, the components of the storage environment 105 are implemented within a single device. In some other embodiments, the components of the storage environment 105 comprise a distributed architecture. For example, the storage environment 105 can comprise of multiple storage devices 140 physically located at different locations but are able to communicate over a communication network to achieve the desired result.

The users 110 are a component of the storage architecture 100 configured to provide data 115 and commands to the storage environment 105. In some embodiments, the users 110 are a server (e.g., WINDOWS, Power Systems, IBM I, UNIX, System Z), a personal computer (e.g., desktop, laptop, tablet), a container, a virtual machine, or any device capable of communicating over a network and provide data 115. The users 110 can send commands to the storage environment 105 to access and manipulate stored data within the storage environment 105. For example, the data 115 can be accessed and manipulated in a variety of ways, such as reading, writing, deleting, and moving the data 115.

The network 125 is a component of the storage architecture 100 configured to facilitate direct, high-speed data transfers and communication between the users 110 and the storage environment 105. In some embodiments, the network 125 is an internal bus. In some embodiments, the network 125 is an external bus. Examples of the network 125 include a local area network (LAN), a wide area network (WAN), a storage area network (SAN), an intranet, or any combination thereof.

The storage controller 130 is a component of the storage environment 105 configured to manage the input and output of data from the network 125 to the storage devices 140. Data can be stored and manipulated depending on the needs of the storage environment 105. In some embodiments, the storage controller 130 arranges and configures storage components within the storage devices 140 in a redundant array of independent disks (RAID) configuration. For example, data stored within the storage environment 105 can be striped across all configured storage components and possibly across the storage devices 140. Various RAID configurations also offer techniques such as striping, mirroring, and providing parity bits.

The storage controller 130 is further configured to manage how the data received by the storage environment 105, is stored and retrieved. For example, in a tier-based storage configuration, data is placed in a storage system 140 best suited for the type of data that is received.

The permission management system 135 is a component of the storage controller 130 configured to dynamically manage access permissions of the users 110 to storage blocks of the stored data 144 stored on the storage devices 140. The permission management system 135 can use predictive techniques to predict the next set of storage blocks that are going to be accessed by the users 110. Additionally, using the same or other predictive techniques, the permission management system 135 can predict an expected moment of time, or time window, when the access is required by the users 110. The storage blocks can correlate to the physical location of the underlying file sectors of the stored data 144 on a particular storage device 140-N or storage devices 140. In the case of a volume group, for example, the logical addresses may suffice. Based on those predictions, the permission management system 134 can grant access to the user 10 to the predicted storage blocks during the moment in time predicted. After a predetermined amount of time, or other metrics, the permission management system can then restrict the access rights of the user to the storage blocks. Additional details of the permission management system 135 are presented in FIG. 2.

The storage bus 138 is a component of storage environment 105 configured to facilitate direct, high-speed transfer and communication between the storage devices 140, either directly or through the storage controller 130. In some embodiments, the storage bus 138 is an internal bus. In some embodiments, the storage bus 138 is an external bus. In some embodiments, the storage bus 138 enables data to be moved without server intervention, therefore freeing up processing cycles on the server end. For example, a disk device can back up its data to a tape device as needed without receiving a command from a server or controller. Examples of the storage bus 138 include a LAN, a WAN, a Fibre Channel (FC), and any combination thereof. In some embodiments, implementations interconnect together into many network configurations capable of communicating over long distances. The storage bus 138 is configured to transfer data utilizing a variety of standards. Some standards include the Small Computer System Interface (SCSI), Fibre Channel, fiber connection (FICON), and Internet Protocol (IP) standards.

The storage devices 140 are components of storage environment 105 configured to store and manage the input and output of data on the storage environment 105. Additionally, the storage devices 140 can store stored data 144 accessible by the users 110. Examples of storage systems 140 include tape systems (e.g., tape drives, tape autoloaders, tape libraries), disk systems, flash systems, hybrid systems, storage arrays, magnetic drives, solid-state drives, and optical drives. In some embodiments, the storage devices 140 include storage efficiency solutions such as real-time compression, automated tiering, virtualization, and thin provisioning.

It is noted that FIG. 1 is intended to depict the representative major components of an exemplary storage architecture 100. In some embodiments, however, individual components may have greater or lesser complexity than as represented in FIG. 1, components other than or in addition to those shown in FIG. 1 may be present, and the number, type, and configuration of such components may vary.

Figure 2:
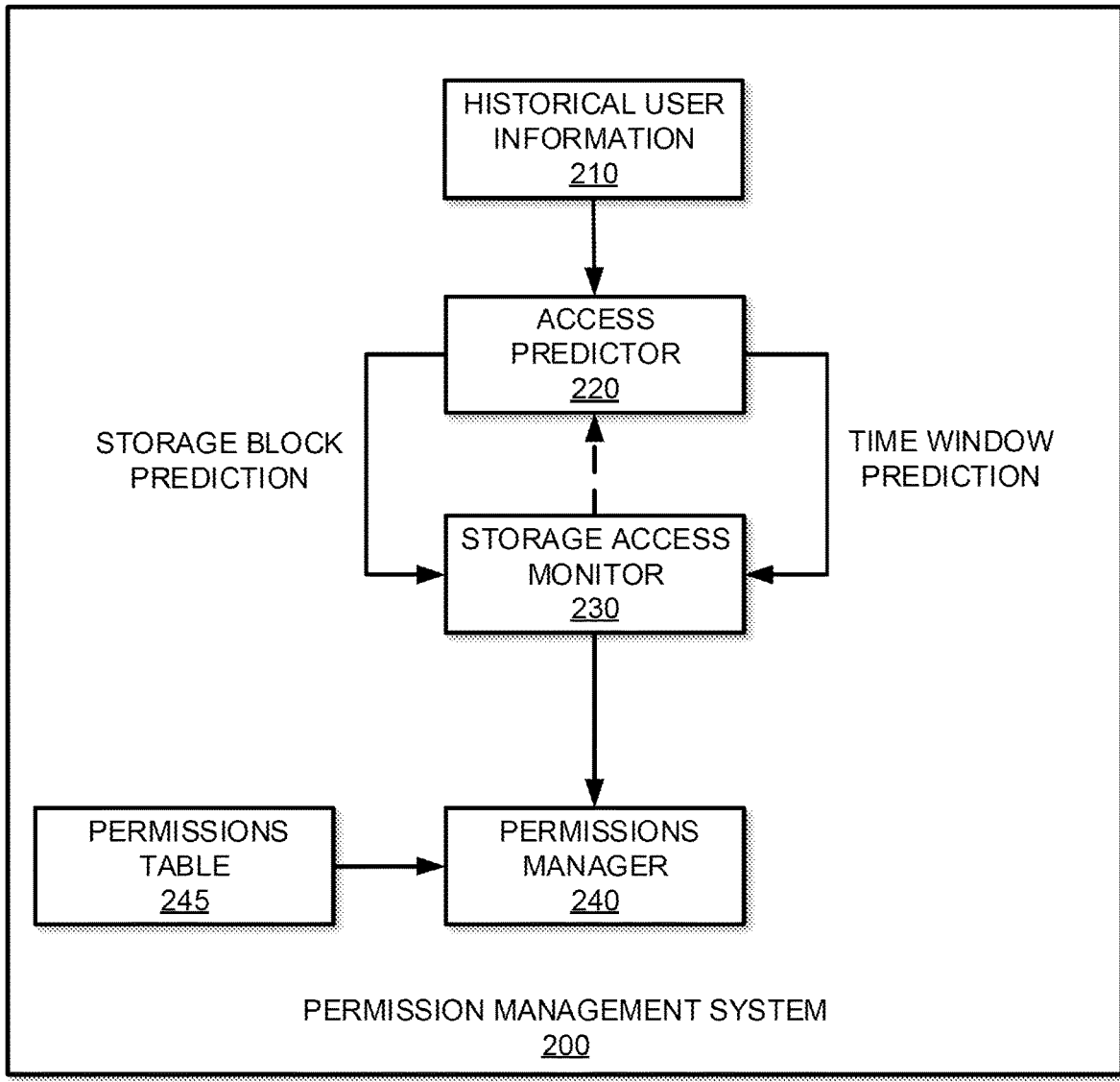
FIG. 2 is a block diagram illustrating a permission management system used by one or more embodiments of the present disclosure.

With reference now to FIG. 2, an exemplary permission management system 200 (analogous to the permission management system 135) is presented. The permission management system 200 includes historical user information 210, an access predictor 220, a storage access monitor 230, a permissions manager 240, and a permissions table 245.

The historical user information 210 is information stored by the permission management system 200 and used by the access predictor 220 in making its predictions. The historical user information includes information from each of the users 110 as well as each program/process accessed by the users 110. The historical user information 210 can also include program/process type information and run-time data collected during normal execution time, historical accesses, and historical access times. The runtime data can include a current context, current load, software stack, storage blocks accessed, time of access, frequency of access, location of access, and the like. In some embodiments, the historical user information is used as training data by the access predictor 220 when training machine learning models to make predictions.

The access predictor 220 is a component of the permission management system 200 configured to predict which storage blocks a user 110-N will access and is further configured to predict when the user 110-N will access the predicted storage blocks. The prediction can be based on a program/process accessed by a user as well as other historical user information 210. In some embodiments, the access predictor utilizes prediction policies to make its predictions. These policies include, but are not limited to, LRU, MRU, first come first serve (FCFS), round-robin, first in first out (FIFO), last in first out (LIFO), first in last out (FILO), time-aware least recently used (TLRU), pseudo-LRU (PLRU), random replacement (RR), segmented LRU (SLRU), least-frequently used (LFU), CLOCK-Pro, adaptive replacement cache (ARC), Pannier, and the like. For example, LFU counts how often an item (e.g., storage block) is needed. Those that are used least often are ignored first. This works similarly to LRU, except that instead of storing the value of how recently a storage block was accessed, LFU stores the value of how many times it was accessed.

In some embodiments, the access predictor 220 utilizes various types of machine learning models to make its predictions. The machine learning models can employ various machine learning techniques in predicting the storage blocks that will be accessed and the time when the storage blocks will be accessed. Machine learning techniques can include algorithms or models that are generated by performing supervised training on a dataset (e.g., the historical user information 210) and subsequently applying the generated algorithm or model to generate the storage block prediction and the time window prediction. Machine learning algorithms can include but are not limited to decision tree learning, association rule learning, artificial neural networks, deep learning, inductive logic programming, support vector machines, clustering, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), hidden Markov models, Gaussian naïve Bayes, multinomial naïve Bayes, averaged one-dependence estimators (AODE), Bayesian network (BN), classification and regression tree (CART), feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

For example, the access predictor 220 can utilize a gradient boost machine (GBM) machine learning process, which uses multiple decision trees that utilize each other's analysis, thus "boosting" the process in order to learn. For example, assume that the first decision tree is a "weak learner" that has many errors when making a prediction based on a set of input data. These errors are weighted such that they are heavily used to retrain a model/decision tree. The process continues until the final model/decision tree is effective at properly predicting a correct output based on any input data.

In another example, the access predictor 220 can utilize a random forest machine learning process, which also uses decision trees, but randomly combines decision trees into a "random forest" of trees. This allows the system to bag features in different decision trees such that features in a particular limb/node in various decision trees that are very strong predictors can describe the different trees as they are correlated. A particular feature that turns out to be a good predictor of some outcome in different decision trees makes these different decision trees correlated, as they produce the same accurate prediction from the same feature.

The storage access monitor 230 is a component of the permission management system 200 configured to monitor access to the storage devices 140 by the users 110. The storage access monitor 230 can monitor the users' 110 activity as well as collect historical user information 210. In some embodiments, when a user 110-N requests access to an unpredicted storage block, that information is transmitted back to the access predictor 220 to implement a retry mechanism. A prediction command can be reissued that allows the access predictor 220 to recompute access predictions based on the unpredicted storage blocks and the time when the request for access was made. Thus, the prediction component can account for that access and rectify the chain of next predictions made. When a user 110-N attempts block-by-block logical file access that was not previously predicted, the permissions manager 240 can determine the appropriate permissions via the permissions table 245 and initiate the retry mechanism. If the user 110-N has the necessary permissions, then the permissions manager 240 can grant the user 110-N access to those unpredicted storage blocks.

In some embodiments, the storage access monitor 230 monitors the activity of the users 110 as they access predicted storage blocks. The storage access monitor 230 can then relay the execution of instructions on the storage blocks by the user 110-N to the permissions manager 240. The storage access monitors 230 can also relay to the permissions manager 240 once the user 110-N has completed their access to the predicted storage blocks.

The permissions manager 240 is a component of the permissions management system 200 configured to provide and deny access to storage blocks stored on the storage devices 140. The different types of access include reading, writing, and performing run operations on the storage blocks. Additionally, the permissions manager 240 can also provide locking commands on the storage blocks. The locking commands include, for example, advisory locking and mandatory locking. File locking, or locking, is a mechanism that restricts access to a file, or storage block, by allowing only one user 110-N to modify or delete it at a specific time and to prevent reading of the file, or storage block, while it is being modified or deleted. In some embodiments, the permissions manager utilizes the permissions table 245 to determine the level of access a particular user 110-N has on a particular storage block.

The permissions manager 240 is further configured to restrict and/or revoke access to the predicted storage blocks. The permissions manager 240 can revoke the access given after a predetermined time, or time window, has occurred, upon notice of access completion, or some other notification indicating that access is no longer required. For example, the access predictor 220 can predict that user 110-1 will access a set of particular storage blocks within a given time period. The permissions manager 240 can grant access to the user 110-1 ahead of that time period, or at that time period, and can then revoke the granted access to the storage blocks once the time period has expired.

It is noted that FIG. 2 is intended to depict the major representative components of an exemplary permission management system 200. In some embodiments, however, individual components may have greater or lesser complexity than as represented in FIG. 2, components other than or in addition to those shown in FIG. 2 may be present, and the number, type, and configuration of such components may vary.

Figure 3:
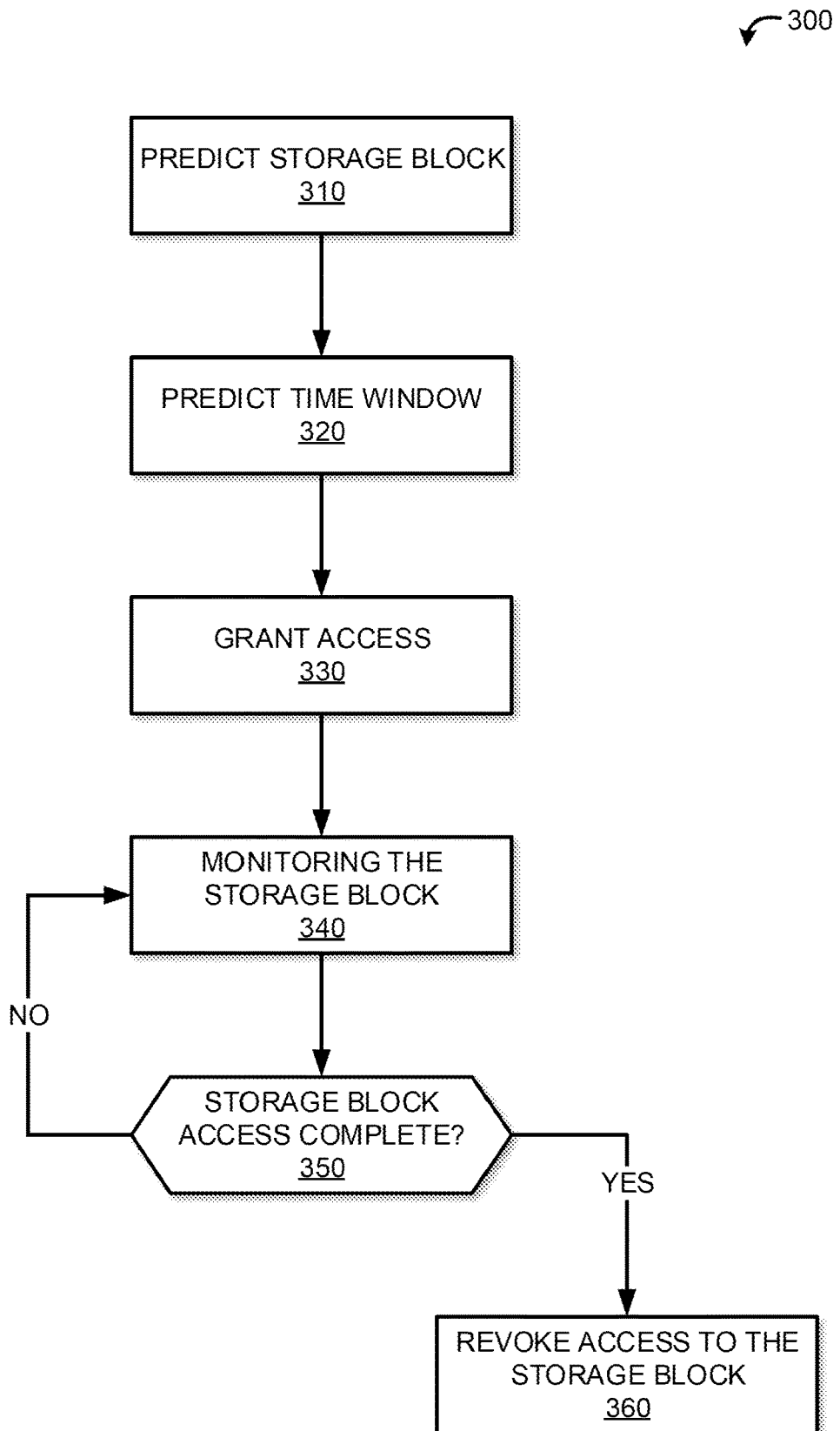
FIG. 3 is a flow diagram illustrating a process of dynamically managing permissions of storage blocks performed in accordance with embodiments of the present disclosure.

FIG. 3 is a flow diagram illustrating a process 300 of dynamically managing permissions of storage blocks, in accordance with embodiments of the present disclosure. The process 300 may be performed by hardware, firmware, software executing on a processor, or a combination thereof. For example, any or all the steps of the process 300 may be performed by one or more processors embedded in a computing device.

The access predictor 220 predicts at least one storage block that a user 110-N will access. This is illustrated at step 310. The prediction can be based on a program/process accessed by a user as well as other historical user information 210. In some embodiments, the access predictor 220 uses a prediction policy to predict the storage block. For example, the access predictor 220 can use a MRU policy to predict the storage block. MRU policies ignore the most recently used items (e.g., storage blocks) first. This can be an optimal policy if the user 110-N is more likely to access an older storage block.

In some embodiments, the access predictor predicts at least one storage block that a user 110-N will access using a machine learning model. The machine learning model can be trained using historical user information 210 to learn the tendencies of the user 110-N to predict the storage block that the user 110-N will access. The machine learning models can employ various machine learning techniques in predicting the storage blocks that will be accessed and the time when the storage blocks will be accessed. For example, the access predictor 220 can be a deep learning machine learning model. For example, a deep learning model can be a convolutional neural network, a recurrent neural network, and the like.

The access predictor 220 predicts a time window of when the user 110-N will access the predicted storage block. This is illustrated at step 320. The prediction can be based on times when a program/process is accessed by a user as well as other historical user information 210. A time window may represent a specific time, a brief moment in time, or a longer period of time. For example, the predicted time window may be five seconds, ten minutes, or several hours. In some embodiments, the access predictor 220 uses a prediction policy to predict the storage block. For example, the access predictor 220 can use a Pseudo-LRU policy that ignores the least recently used storage block and the time that storage block was accessed. The Pseudo-LRU can also approximate the measures of the time and storage blocks to optimize its predictions. The access predictor 220 can use the same, or other techniques, when making both predictions. For example, the access predictor 220 may use LRU when predicting the storage blocks, and it may use MRU when predicting the time window.

In some embodiments, the access predictor predicts the time window when a user 110-N will access the storage block using a machine learning model. The machine learning model can be trained using historical user information 210 to learn the tendencies of the user 110-N to predict when the storage block will be accessed by the user 110-N will. The machine learning models can employ various machine learning techniques in predicting the storage blocks that will be accessed and the time when the storage blocks will be accessed. For example, the access predictor 220 utilizes a random forest machine learning process, which also uses decision trees, but randomly combines decision trees into a "random forest" of trees.

The permissions manager 240 grants the user 110-N access to the predicted storage blocks. This is illustrated at step 330. In some embodiments, permission is granted to the user 110-N ahead of the predicted time window. The permission can be granted in such a way so as to grant the user 110-N access to the storage blocks just in time for when the user 110-N needs to access the storage blocks. For example, the permissions manager 240 can grant permission to the user seconds before the predicted time window. Depending on the accuracy of the time window, granting the permission can be adjusted to accommodate for slight variances when the user 110-N may access the storage block. For example, if there is a large variance of when the user 110-N may access the storage blocks, then permissions manager 240 may grant access permission several minutes ahead of the time window.

The storage access monitor 230 monitors the predicted storage blocks for access by the user 110-N. This is illustrated at step 340. The storage access monitor 230 can monitor the users' 110 activity as well as collect historical user information 210. The storage access monitor 230 can then relay the execution of instructions on the storage blocks by the user 110-N to the permissions manager 240. The storage access monitors 230 can also relay to the permissions manager 240 once the user 110-N has completed their access to the predicted storage blocks.

The storage access monitor 230 determines whether the storage block access has been completed by the user 110-N. This is illustrated at step 350. Completion can be dictated in several ways. For example, access competition can be a predetermined amount of time, a number of access commands performed on the storage blocks, a completion notice transmitted back to the storage access monitor 230, or some other indicator notifying the storage access monitor 230 that access to the storage block is complete. If the access is not complete, then the storage access monitor 230 continues to monitor the predicted storage block. Otherwise, the process 300 proceeds to step 360. Once access to the storage block is complete, the permissions manager 240 revokes the granted access to the storage block by the user 110-N. This is illustrated at step 360.

Figure 4:
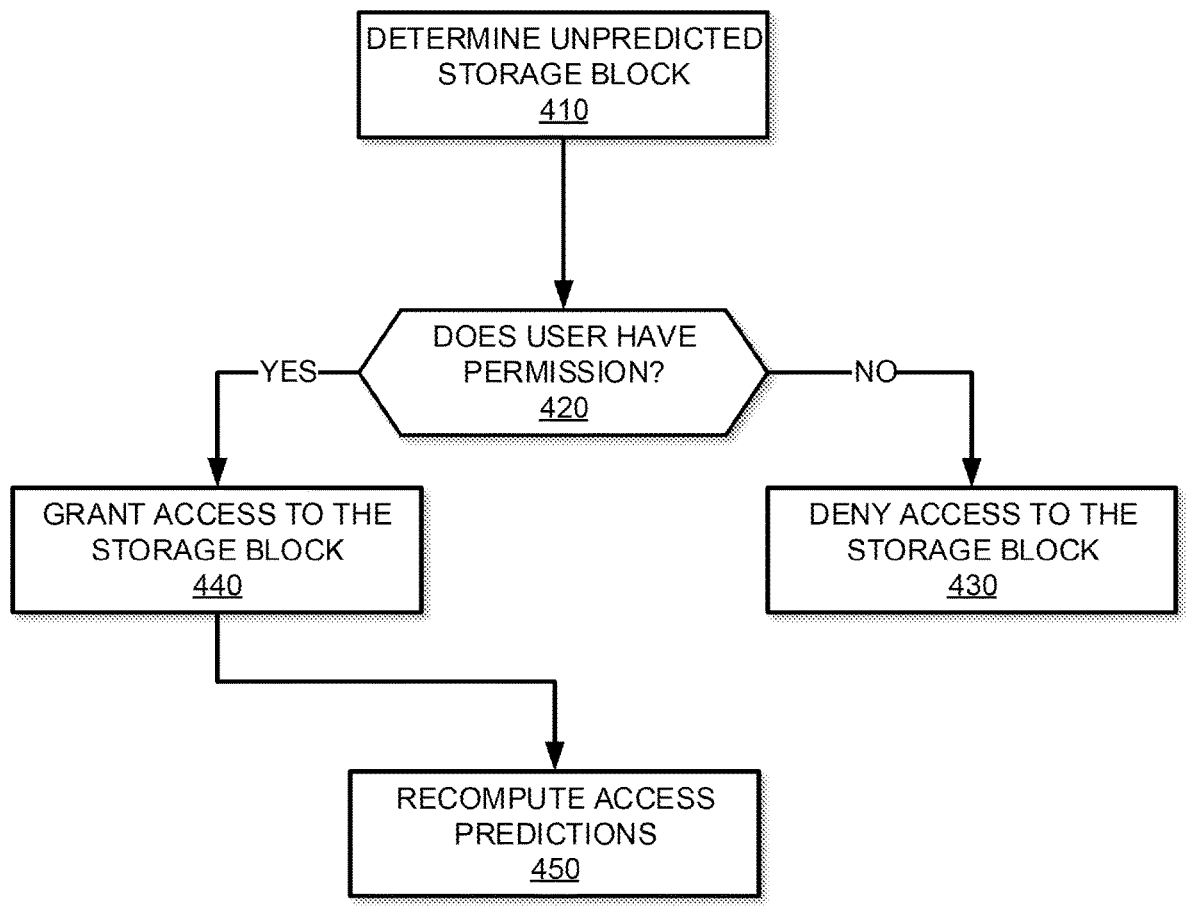
FIG. 4 is a flow diagram illustrating a process of adjusting storage block predictions performed in accordance with embodiments of the present disclosure.

FIG. 4 is a flow diagram illustrating a process 400 adjusting storage block predictions, in accordance with embodiments of the present disclosure. The process 400 may be performed by hardware, firmware, software executing on a processor, or a combination thereof. For example, any or all the steps of the process 400 may be performed by one or more processors embedded in a computing device.

The storage access monitor 230 determines that the user 110-N is requesting access to a storage block that was not predicted by the access predictor 220. This is illustrated at step 410. The unpredicted storage block can be any storage block that was not predicted and granted access to the user 110-N when the request was made. An unpredicted storage block may either be a storage block that was not predicted and/or a storage block that was requested at a different time than was predicted. For example, the unpredicted storage block may have been predicted by the access predictor 220, but the time window prediction for access to the block was at a different time than was predicted.

The permissions manager 240 determines whether the user 110-N has the appropriate permissions to access the requested storage blocks. This is illustrated at step 420. In some embodiments, the permissions manager 240 accesses the permissions table 245 to determine the access rights of the user 110-N. Access may be granted or denied based on the type of access request being requested. For example, the user 110-N may be requesting write access to the storage block, but the user 110-N may only have read access permissions. If the user 110-N lacks the permission to access the requested storage block, then the permissions manager 240 denies the request. This is illustrated at step 430. Otherwise, the permissions manager 240 grants access to the requested storage block. This is illustrated at step 440.

The access predictor 220 recomputes the access predictions based on the unpredicted storage block access request. This is illustrated at step 450. When a user 110-N requests access to an unpredicted storage block, that information is transmitted back to the access predictor 220 to implement a retry mechanism. A prediction command can be reissued that allows the access predictor 220 to recompute access predictions based on the unpredicted storage blocks and the time when the request for access was made.

Figure 5:
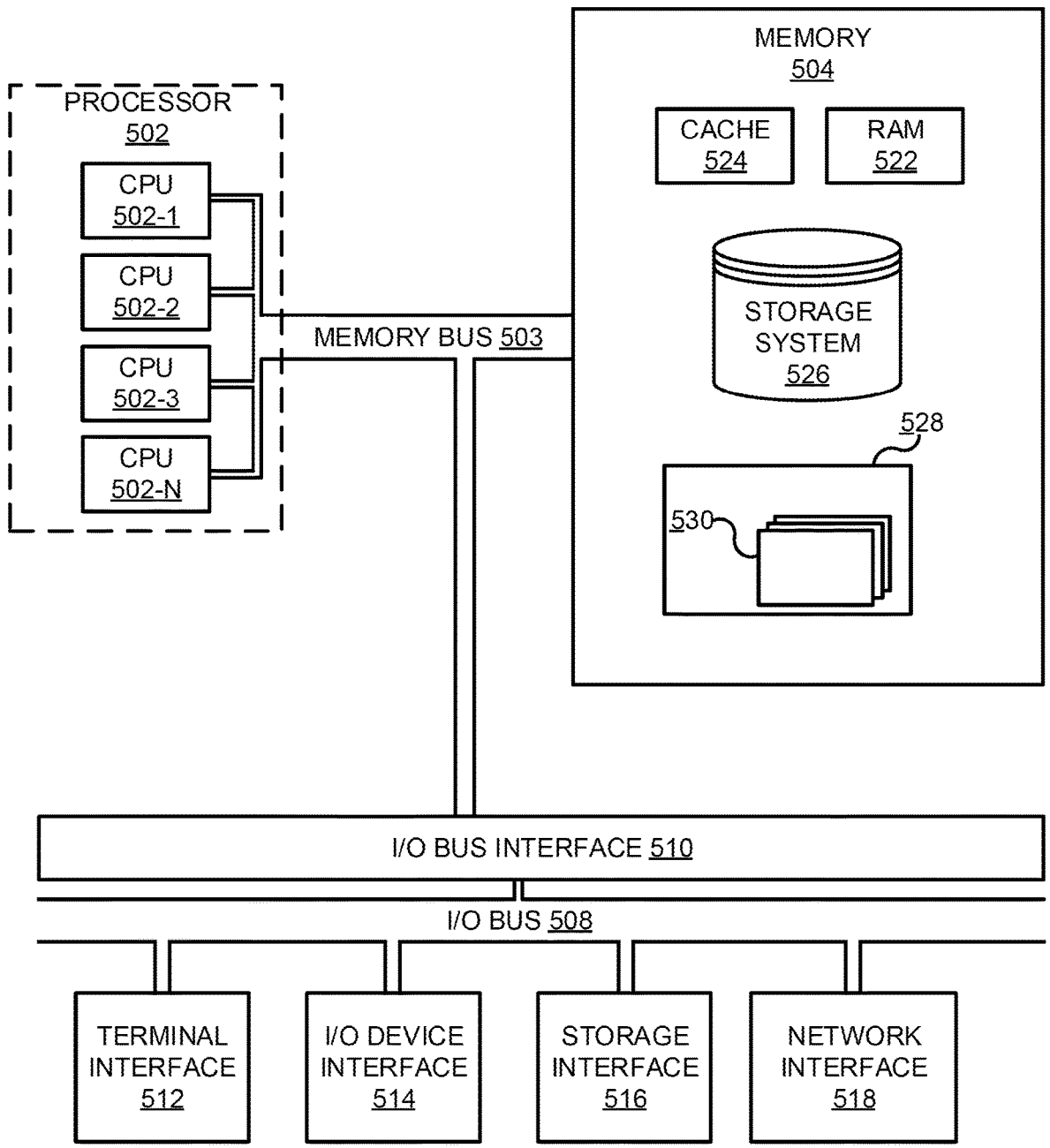
FIG. 5 is a high-level block diagram illustrating an example computer system that may be used in implementing one or more of the methods, tools, and modules, and any related functions, described herein in which the disclosure may be implemented.

Referring now to FIG. 5, shown is a high-level block diagram of an example computer system 500 (e.g., the permission management system 200) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 500 may comprise one or more processors 502, a memory 504, a terminal interface 512, an I/O (Input/Output) device interface 514, a storage interface 516, and a network interface 518, all of which may be communicatively coupled, directly or indirectly, for inter-component communication via a memory bus 503, an I/O bus 508, and an I/O bus interface 510.

The computer system 500 may contain one or more general-purpose programmable central processing units (CPUs) 502-1, 502-2, 502-3, and 502-N, herein generically referred to as the processor 502. In some embodiments, the computer system 500 may contain multiple processors typical of a relatively large system; however, in other embodiments, the computer system 500 may alternatively be a single CPU system. Each processor 502 may execute instructions stored in the memory 504 and may include one or more levels of onboard cache.

The memory 504 may include computer system readable media in the form of volatile memory, such as random-access memory (RAM) 522 or cache memory 524. Computer system 500 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

Although the memory bus 503 is shown in FIG. 5 as a single bus structure providing a direct communication path among the processors 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units, multiple I/O buses, or both. Further, while multiple I/O interface units are shown, which separate the I/O bus 508 from various communications paths running to the various I/O devices, in other embodiments, some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the major representative components of an exemplary computer system 500. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 (e.g., the permission management system 200), may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and P.D.A.s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 6:
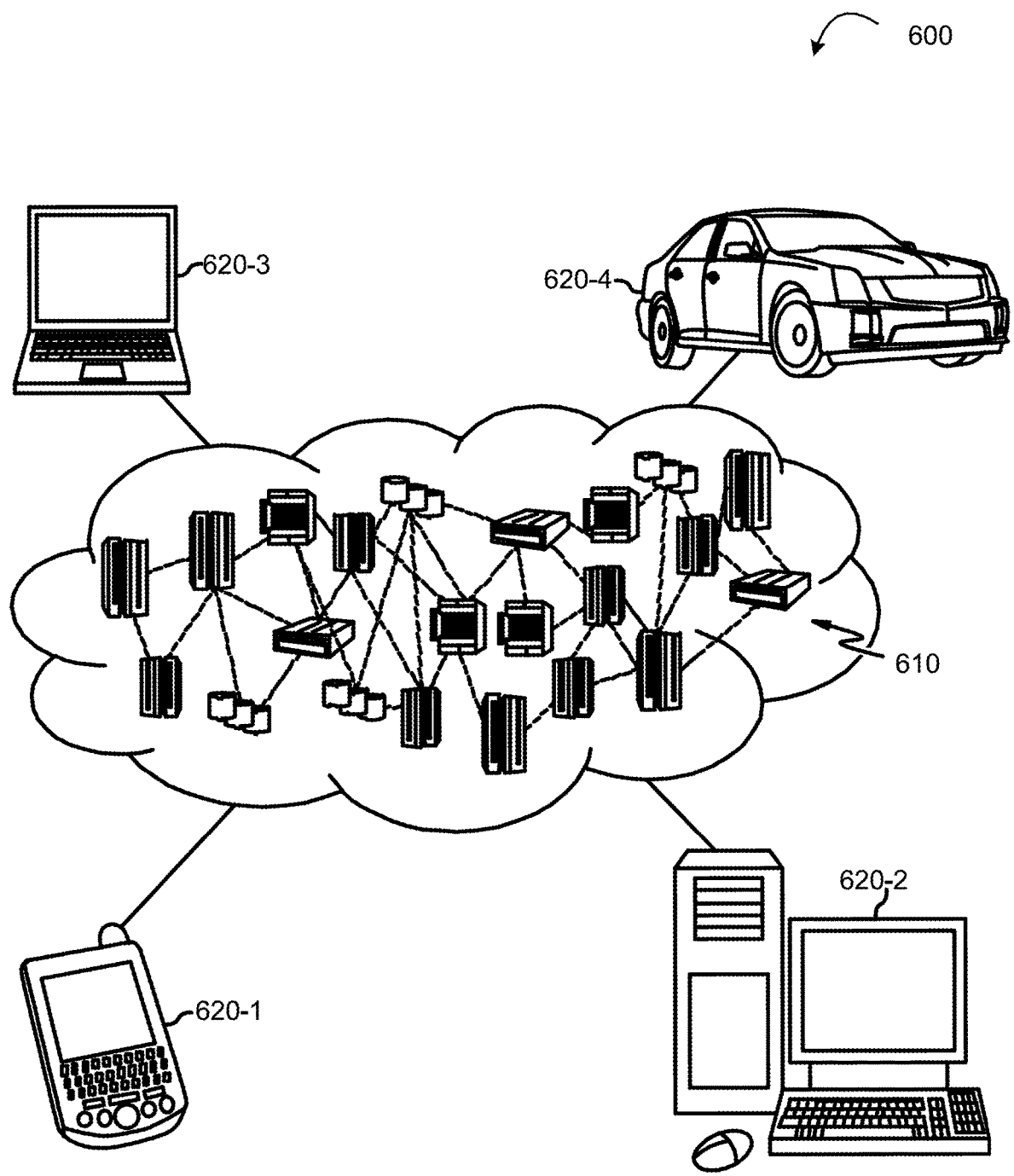
FIG. 6 depicts a cloud computing environment in accordance with embodiments of the present disclosure.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (P.D.A.) or cellular telephone 620-1, desktop computer 620-2, laptop computer 620-3, and/or automobile computer system 620-4 may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 620-1 to 620-4 shown in FIG. 6 are intended to be illustrative only and that computing nodes 610 and cloud computing environment 600 can communicate with any type of computerized device over any type of network and/or network addressable connection (e.g., using a web browser).

Figure 7:
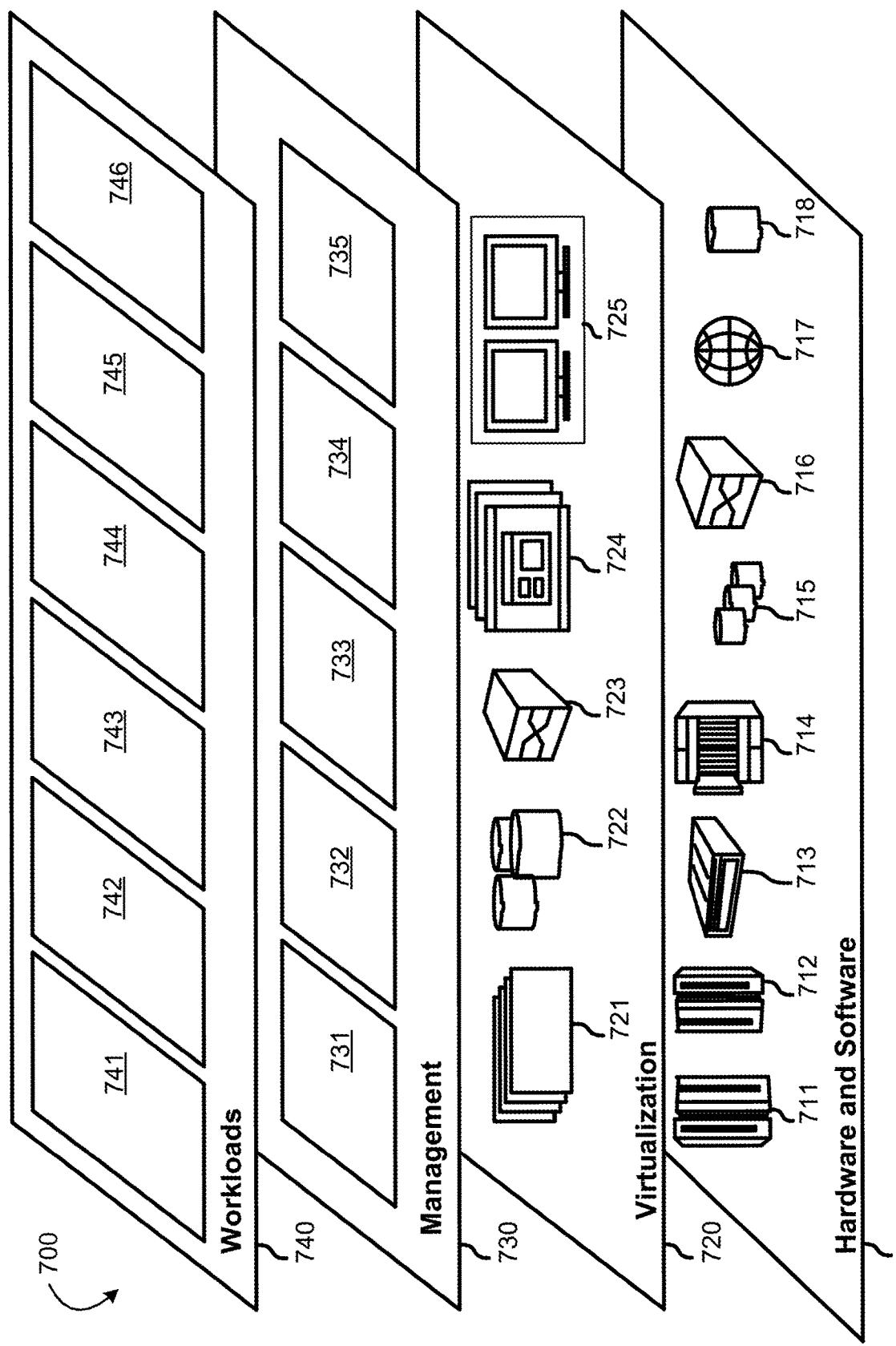
FIG. 7 depicts abstraction model layers in accordance with embodiments of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 710 includes hardware and software components. Examples of hardware components include mainframes 711; RISC (Reduced Instruction Set Computer) architecture-based servers 712; servers 713; blade servers 714; storage devices 715; and networks and networking components 716. In some embodiments, software components include network application server software 717 and database software 718.

Virtualization layer 720 provides an abstraction layer from which the following examples of virtual entities may be provided: virtual servers 721; virtual storage 722; virtual networks 723, including virtual private networks; virtual applications and operating systems 724; and virtual clients 725.

In one example, management layer 730 may provide the functions described below. Resource provisioning 731 provides dynamic procurement of computing resources and other resources that are utilized to perform tasks within the cloud computing environment. Metering and Pricing 732 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 733 provides access to the cloud computing environment for consumers and system administrators. Service level management 734 provides cloud computing resource allocation and management such that required service levels are met. Service Level Agreement (S.L.A.) planning and fulfillment 735 provide pre-arrangement for, and procurement of, cloud computing resources for which a future requirement is anticipated in accordance with an S.L.A.

Workloads layer 740 provides examples of functionality for which the cloud computing environment may be utilized. Examples of workloads and functions which may be provided from this layer include mapping and navigation 741; software development and lifecycle management 742 (e.g., the permission management system 200); virtual classroom education delivery 743; data analytics processing 744; transaction processing 745; and a threat similarity analysis system 746.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of dynamically managing permissions of storage blocks, the computer-implemented method comprising:
   predicting, by utilizing at least one prediction policy, at least one storage block that will be accessed by a user on a storage device using a machine learning model that is trained using historical information from the user including programs or processes accessed by the user;
   predicting, by utilizing the at least one prediction policy, a time window when the storage block will be accessed by the user using a machine learning model that is trained using historical access times and operating patterns performed by the user on the storage device;
   granting the user an access to the storage block during the predicted time window and ahead of the predicted time window in order to grant the user access in time for when the user needs to access the storage block;
   monitoring whether the storage block is accessed by the user;
   determining, based on the monitoring, access to the storage block has been completed by the user; and
   revoking the access to the storage block granted to the user after a predetermined access time,
   wherein the at least one storage block correlates to a physical location of an underlying file sector of stored data on the storage device.

2. The computer-implemented method of claim 1, further comprising:
   determining the user accessed an unpredicted storage block;
   verifying access permissions to the unpredicted storage block by the user;
   granting, based on verifying the access permissions, the unpredicted storage block to the user; and
   recomputing access predictions based on the unpredicted storage block and a time when the unpredicted storage block was accessed.

3. The computer-implemented method of claim 1, wherein the storage block is a logical file block of a physical disk sector.

4. The computer-implemented method of claim 1, wherein the storage block is a portion of a file on a file system stored on the storage device.

5. The computer-implemented method of claim 1, wherein predicting the storage block is performed by a machine learning model based on historical accesses performed by the user on the storage device.

6. The computer-implemented method of claim 1, wherein the user is a container.

7. A system of dynamically managing permissions of storage blocks, the system comprising:
   a memory;
   a processor; and
   local data storage having stored thereon computer executable code, wherein the computer executable code includes program instruction executable by a processor to cause the processor to perform a method, wherein the method comprises:
   predicting, by utilizing at least one prediction policy, at least one storage block that will be accessed by a user on a storage device using a machine learning model that is trained using historical information from the user including programs or processes accessed by the user;
   predicting, by utilizing the at least one prediction policy, a time window when the storage block will be accessed by the user using a machine learning model that is trained using historical access times and operating patterns performed by the user on the storage device;
   granting the user an access to the storage block during the predicted time window and ahead of the predicted time window in order to grant the user access in time for when the user needs to access the storage block;
   monitoring whether the storage block is accessed by the user;
   determining, based on the monitoring, that the user accessed the storage block; and
   revoking the access to the storage block granted to the user after a predetermined access time,
   wherein the at least one storage block correlates to a physical location of an underlying file sector of stored data on the storage device.

8. The system of claim 7, wherein the processor is further able to perform:
   determining the user accessed an unpredicted storage block;
   verifying access permissions to the unpredicted storage block by the user;
   granting, based on verifying the access permissions, the unpredicted storage block to the user; and
   recomputing access predictions based on the unpredicted storage block and a time when the unpredicted storage block was accessed.

9. The system of claim 7, wherein the storage block is a logical file block of a physical disk sector.

10. The system of claim 7, wherein the storage block is a portion of a file on a file system stored on the storage device.

11. The system of claim 7, wherein predicting the storage block is performed by a machine learning model based on historical accesses performed by the user on the storage device.

12. A computer program product including computer readable storage media of dynamically managing permissions of storage blocks, having computer executable instructions that when executed by at least one computer cause the at least one computer to execute the instructions to:
   predict, by utilizing at least one prediction policy, at least one storage block that will be accessed by a user on a storage device using a machine learning model that is trained using historical information from the user including programs or processes accessed by the user;
   predict, by utilizing the at least one prediction policy, a time window when the storage block will be accessed by the user using a machine learning model that is trained using historical access times and operating patterns performed by the user on the storage device;
   grant the user an access to the storage block during the predicted time window and ahead of the predicted time window in order to grant the user access in time for when the user needs to access the storage block;
   monitor whether the storage block is accessed by the user;
   determine, based on the monitoring, that the user accessed the storage block; and
   revoke the access to the storage block granted to the user after a predetermined access time,
   wherein the at least one storage block correlates to a physical location of an underlying file sector of stored data on the storage device.

13. The computer program product of claim 12, further comprising instructions to:

determining the user accessed an unpredicted storage block;
verifying access permissions to the unpredicted storage block by the user;
granting, based on verifying the access permissions, the unpredicted storage block to the user; and
recomputing access predictions based on the unpredicted storage block and a time when the unpredicted storage block was accessed.

14. The computer program product of claim 12, wherein the instructions to predict the storage block is performed by a machine learning model based on historical accesses performed by the user on the storage device.

\* \* \* \* \*